United States Patent Office 3,150,113
Patented Sept. 22, 1964

3,150,113
AMORPHOUS POLYAMIDES BASED ON TEREPHTHALIC ACID AND ALKYL SUBSTITUTED HEXAMETHYLENE DIAMINES
Rudolf Gabler, Zollikerberg, Zurich, Switzerland, assignor to W. R. Grace & Co., Cambridge, Mass., a corporation of Connecticut
No Drawing. Filed June 30, 1961, Ser. No. 120,969
Claims priority, application Great Britain, May 8, 1961, 16,727/61
4 Claims. (Cl. 260—33.4)

This invention relates to synthetic linear polyamides and particularly to terephthalamide polymers which are transparent, thermoplastic and characterized by a high degree of swelling in certain organic liquids. The new polyamides of my invention cannot be drawn to form useful textile fibers but are easily moldable by injection or vacuum molding techniques or by extrusion, to form a large variety of useful shaped articles. In addition, because of their ability to swell and become liquefied in polar organic solvents, the new polyamides of my invention may be used in coatings or adhesives, or may be cast into clear, tough transparent films.

Linear fiber-forming polyamides suitable for use in the manufacture of tire cords have been made by condensing terephthalic acid with polymethylene diamines having from six to eight carbon atoms in the hydrocarbon chain and substituted by one, or at the most two, methyl groups. These polyamides, which are described in United States Patent No. 2,752,328, are typical nylon polymers, being opaque, highly crystalline, easily drawn to form useful textile fibers, and melting over a narrow temperature range.

I have discovered that polyamides of radically different properties from the fiber-forming nylons described above may be made by condensing substantially equimolar proportions of terephthalic acid with a mixture of 3-methyl- and 2-methyl-hexamethylene-diamine.

Although the polyamides of my invention are closely similar in chemical structure to those of the prior art, they nevertheless possess a number of strikingly different characteristics which set them apart from the prior art polymers. The most striking property of the new polyamides of my invention is their transparent, glass clear appearance, which presists even after prolonged periods of heating and slow cooling. It is evident that these new polymers are completely amorphous, and that their amorphous state is thermodynamically stable. The new polymers, furthermore, soften gradually over a wide temperature range, usually about 20 to 40 degrees centigrade, and for this reason are particularly well suited to molding and other shaping procedures. They are not only soluble in typical polyamide solvents such as sulfuric acid, formic acid, phenol and cresol, but also swell extensively in the lower alcohols, for example, methanol, ethanol and isopropanol, to give honey-like pourable masses suitable for coating and adhesive applications. The polyamides of my invention have excellent tensile strength, impact resistance, and flexibility. Unlike conventional polyamides, however, they have a very low capacity for elongation. This property, together with their completely amorphous nature, makes the polyamides of my invention unsuitable for the production of artificial textile fibers.

My invention is of particular advantage in manufacturing polyterephthalamides because it enables me to use a relatively inexpensive alkylated hexamethylenediamine. Alkylated hexamethylenediamines are often prepared by oxidizing alkylated phenols to dicarboxylic acids, which are reacted with ammonia to form the corresponding dinitriles. The dinitriles are then converted by catalytic hydrogenation to the alkyl-substituted hexamethylenediamines. Thus, starting with p-cresol, the end product is 3-methylhexamethylenediamine. Crude or technical grade cresol, a mixture of m- and p-cresol in about equal proportions, is, of course, far less expensive than either the m- or p-isomer in pure form. When crude cresol is used in the above-described synthesis of methylhexamethylenediamine, a mixture of isomers containing 75 percent 3-methyl- and 25 percent 2-methyl-hexamethylenediamine is obtained. Rather unexpectedly, this isomeric mixture of diamines has proved to be an excellent raw material for the production of amorphous, transparent polyterephthalamides.

My invention will be more clearly understood by reference to the following example:

EXAMPLE 16.6 parts by weight of terephthalic acid were mixed with 30 ml. water and brought almost to boiling on a steam bath. By means of a dropper funnel, a solution of 15.5 parts of a mixture containing 75 percent 3-methyl- and 25 percent 2-methyl- hexamethylenediamine in 50 ml. alcohol was slowly added dropwise; this finally resulted in the complete solution of the terephthalic acid. After cooling, the terephthalic acid salt of the 3-methyl-2-methyl-hexamethylenediamine mixture precipitated out as colorless crystals.

A mixture of 300 g. of the above salt, 100 ml. water and 0.5 g. of glacial acetic acid was heated to 140° C. with constant agitation and exclusion of air in a 1 liter dissolving vessel of a stainless steel autoclave also having a capacity of 1 liter, resulting in the total solution of the salt. With the aid of pure nitrogen, the solution was passed through a filter into the autoclave which had been preheated to 250° C. This resulted in a drop in temperature within the autoclave to 160 to 180° C. When the heat was turned on, the pressure and temperature rose rapidly. Water vapor was released by opening the valve in the cover so that pressure equalization with atmospheric pressure was obtained at approximately the same time that an inside temperature of 250° C. was reached.

The melt was now heated without pressure to a temperature of 280° C. over a period of 3½ hours. The temperature was held at this point for 2 hours more and then the melt was extruded into cold water by means of nitrogen pressure, so as to form cylindrical rods. The polymer was transparent, melted over the range of 250 to 270° C. and had an intrinsic viscosity of 1.2. The rods were found to have good physical and mechanical properties. They could be cut with a knife without crumbling, were tough and strong, and had a high impact resistance. The polymer could be melted and extruded or injection molded to give useful articles of a variety of shapes. It could be cast or otherwise formed into a tough, transparent film suitable for packaging purposes.

The polyamide made according to the above example was compared with the terephthalamides of isomerically pure 3-methylhexamethylenediamine and 2-methylhexamethylenediamine, the results of the comparison being shown in Table I.

*Table I*

| Diamine used | Melting point, °C. | Softening range, °C. | Optical properties | Crystallinity | Useful textile fibers |
|---|---|---|---|---|---|
| 75% 3-methyl-/ 25% 2-methyl-hexamethylene. | 250-270 | <30 | Clear | Amorphous | No. |
| 3-methyl-hexamethylene. | 258-260 | 2-5 | Opaque | Crystalline | Yes. |
| 2-methyl-hexamethylene. | 298-300 | 2-5 | ...do..... | .....do....... | Yes. |

It will be seen by reference to Table I that the new polyamides of my invention possess properties which are strikingly and unexpectedly different from the very closely related polymers produced from pure 3-methyl- and 2-methyl-hexamethylenediamine. The sudden change from opaque, crystalline, textile fiber-forming polymers to glass clear, completely amorphous, resins which cannot be drawn to form useful textile fibers with such a seemingly minor change in structure could not have been predicted.

The new polyamide of my invention was found, on testing, to have a very high yield stress, about twice that of a conventional polyamide, nylon-6, with which it was compared. It was capable, furthermore, of withstanding very high compressive loads without substantial deformation. These properties, together with its glass clear, transparent appearance, wide softening range, high tensile strength, impact resistance and flexibility, and a room temperature elongation at break of less than 10 percent, make the new polyamide a most interesting and versatile material for molding purposes. It also exhibits a high degree of swelling in the lower alcohols and is soluble in solvent mixtures containing 80 percent by volume of chloroform and 20 percent by volume of methanol. It has been found to be highly useful in the production of shaped articles including molded goods of all kinds, sheets and films, as well as for coating and adhesive applications.

I claim:

1. A process for the production of a linear polyamide which comprises condensing terephthalic acid with a substantially equimolar proportion of an isomeric mixture of about 75 percent of 3-methylhexamethylenediamine and about 25 percent of 2-methylhexamethylenediamine.

2. The linear polyterephthalamide formed by the process of claim 1.

3. A liquid composition which comprises a lower aliphatic alcohol selected from the group consisting of methanol, ethanol and isopropanol, and a linear polyterephthalamide formed by condensing substantially equimolar proportions of terephthalic acid and a mixture of about 75 percent of 3-methylhexamethylenediamine and 25 percent of 2-methylhexamethylenediamine, the polyterephthalamide being highly swollen by the alcohol.

4. A solution of the linear polyterephthalamide formed by condensing substantially equimolar proportions of terephthalic acid and a mixture of about 75 percent of 3-methylhexamethylenediamine and 25 percent of 2-methylhexamethylenediamine in a mixed solvent of about 80 parts by volume of chloroform and 20 parts by volume of methanol.

References Cited in the file of this patent

UNITED STATES PATENTS

| 2,752,328 | Magat | June 26, 1956 |
| 2,766,221 | Lum et al. | Oct. 9, 1956 |
| 2,864,807 | Nobis et al. | Dec. 16, 1958 |
| 2,902,475 | Burkhard | Sept. 1, 1959 |

OTHER REFERENCES

Floyd: Polyamide Resins; Reinhold Applications Series; Reinhold Publishing Corporation, 1958, Chapter 9 relied on.